(12) United States Patent
Kaminsky et al.

(10) Patent No.: US 11,275,767 B2
(45) Date of Patent: Mar. 15, 2022

(54) ANALYZING APPLICATION BEHAVIOR TO DETERMINE RELATIONSHIPS BETWEEN DATA

(71) Applicant: International Business Machines Corporation, Armonk, NY (US)

(72) Inventors: David L. Kaminsky, Chapel Hill, NC (US); Girish Sundaram, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/843,318

(22) Filed: Apr. 8, 2020

(65) Prior Publication Data
US 2020/0233884 A1 Jul. 23, 2020

Related U.S. Application Data

(63) Continuation of application No. 14/799,826, filed on Jul. 15, 2015, now Pat. No. 10,706,075.

(51) Int. Cl.
*G06F 16/28* (2019.01)

(52) U.S. Cl.
CPC .................. *G06F 16/284* (2019.01)

(58) Field of Classification Search
CPC ...................................... G06F 16/284
USPC ....................................... 707/769
See application file for complete search history.

(56) References Cited

U.S. PATENT DOCUMENTS

| | | | |
|---|---|---|---|
| 7,676,589 B2 | 3/2010 | Chowdary et al. | |
| 8,260,824 B2 | 9/2012 | Mao et al. | |
| 8,489,647 B2 | 7/2013 | Briggs et al. | |
| 8,615,527 B2 | 12/2013 | Dettinger et al. | |
| 8,676,859 B2 | 3/2014 | Sayal et al. | |
| 9,235,412 B1* | 1/2016 | Cohen | G06F 11/3684 |
| 2006/0271510 A1 | 11/2006 | Harward et al. | |
| 2008/0133491 A1* | 6/2008 | Iwao | G06F 16/256 |
| 2011/0040745 A1* | 2/2011 | Zaydman | G06F 16/284 |
| | | | 707/714 |
| 2011/0137891 A1 | 6/2011 | Brodsky et al. | |
| 2013/0018902 A1 | 1/2013 | Vickers et al. | |
| 2013/0066888 A1 | 3/2013 | Kureshy et al. | |
| 2013/0219057 A1* | 8/2013 | Li | G06F 11/3495 |
| | | | 709/224 |
| 2014/0095547 A1 | 4/2014 | Guo et al. | |
| 2014/0130020 A1* | 5/2014 | Boshernitsan | G06F 8/71 |
| | | | 717/131 |

(Continued)

OTHER PUBLICATIONS

Rashid, et al., "Dynamic Relationships in Object Oriented Databases: A Uniform Approach", retrieved from internet Jul. 13, 2015, 10 pages.

(Continued)

*Primary Examiner* — Vincent F Boccio
*Assistant Examiner* — Alicia M Antoine
(74) *Attorney, Agent, or Firm* — Edell, Shapiro & Finnan, LLC (57) ABSTRACT

Application behavior is analyzed to determine relationships between data. Database objects accessed by an application are identified. Then, one or more relationships between the identified database objects are determined based on one or more from a group comprising statements of the application referring to the identified database objects and sets of the identified database objects accessed by different modules of the application.

17 Claims, 3 Drawing Sheets

(56) References Cited

U.S. PATENT DOCUMENTS

| | | |
|---|---|---|
| 2015/0120698 A1 | 4/2015 | Plattner et al. |
| 2015/0161235 A1 | 6/2015 | Libfeld et al. |
| 2016/0055212 A1 | 2/2016 | Young et al. |
| 2016/0063072 A1 | 3/2016 | N et al. |
| 2016/0314301 A1* | 10/2016 | Johns .................... G06F 21/577 |
| 2016/0321231 A1 | 11/2016 | Lehmann et al. |
| 2017/0017710 A1 | 1/2017 | Kaminsky et al. |

OTHER PUBLICATIONS

Yen et al., "The Analysis of Relationships in Databases for Rule Derivation", retrieved from internet Jul. 13, 2015, 33 pages.

List of IBM Patents or Patent Applications Treated as Related, filed Apr. 8, 2020.

* cited by examiner

ANALYZING APPLICATION BEHAVIOR TO DETERMINE RELATIONSHIPS BETWEEN DATA

BACKGROUND

1. Technical Field

Present invention embodiments relate to determining relationships between data by analyzing application behavior, and more specifically, to accurately identifying data relationships by analyzing run time behavior of applications.

2. Discussion of the Related Art

In order to improve the discovery of data relationships, various automated data discovery tools, such as IBM INFOSPHERE Discovery, have been developed. Automating the discovery of data relationships within and across heterogeneous systems allows a user to create a complete 360-degree view of various data assets. Automating this process may also reduce analysis time by up to 90%, improve accuracy, provide higher levels of visibility into potential data problems, and provide insight into business objects and transformation rules, which may speed time to value for critical initiatives, among other advantages. However, many current approaches to automatically discovering data relationships within data require extensive amounts of time and computing resources to determine data relationships, especially when a vast data set is being analyzed, and require significant user input in order to refine the accuracy of detected relationships.

More specifically, the work done by automated data discovery tools in examining data and detecting relationships is generally referred to as the discovery process and includes two phases: analysis and mapping. The analysis phase of the discovery process involves identifying data types, discovering the relationships within each data set (source and target), and using the identified data types and discovered relationships to discover the relationships between the source and target data sets. However, as relationships are discovered, most analysis tools require an analyst to review the discovered results to ensure accurate results. Typically, the analyst selects the most appropriate options to use in subsequent actions to determine which results would benefit from refinement or re-discovery. Usually, the best results are obtained when an analyst iteratively reviews the discovered results and approves only the most accurate relationships before proceeding.

In order to perform the aforementioned tasks, critical information must be obtained from subject matter experts ("SME's) to verify and validate the relationships discovered by the analysis tool. Specifically, since using data analysis tools to automatically derive relationships gives rise to a great number of false positives, SME validation is required to approve and filter the results. However, in many cases the required SME's might not exist, rendering validation impossible or at least impractical. For example, consider a corporate system that includes a number of data tables, including an employee table (with details relating to an employee's role in the corporation), an employee detail table (with details relating to the employee's personal information), a department table (with details relating to the employee's department), a manager table (with details relating to the employee's manager), and a store table (with details relating to the specific store that the employee works at). In such a situation, an automatic discovery tool may incorrectly automatically associate the employee's social security number with an employee and/or manager number, incorrectly automatically associate the store number with the manager and employee's zip code, and incorrectly automatically associate different phone numbers with each other simply because the form of the data is similar or because the data matches some other methodology followed by the analysis tool. Without the requisite SME's, these incorrect associations cannot be detected by the analysis tool and, thus, an analyst would be required to remove these incorrect relationships in order to ensure accurate discovery.

Moreover, typically, an automatic data analysis tool must compare each and every piece or segment of data in a data set with every piece or segment in data in another data set in order to determine where or if relationships exits. Thus, analyzing large data sets may take significantly more time due to the intensive nature of the work that must be performed. For example, if a data tool were used to determine any relationships between two two-column tables, each row from the first table may be compared to the row from the second table, similar to a database cross join, to derive potential relationships between the two tables. Thus, comparing even a two column, five row table with a two column, six row table may require at least 30 operations just to begin to determine relationships in the data. As the complexity of the analysis increases (e.g., by increasing the number of columns, tables, and/or records to be analyzed) resource consumption associated with the analysis increases exponentially. Consequently, using actual physical data analysis to derive potential relationships between various tables defined at the application level can be extremely time consuming and resource intensive.

The mapping phase of the discovery process uses the information discovered as a result of the analysis phase to discover the joins, bindings, and transformations that correctly derive the target data from the source data. Again, many data analysis tools may automatically complete this phase, however, in order to achieve the highest possible accuracy, an analyst reviews and analyzes the results and runs additional discovery and refinement steps (e.g., filters or aggregation) to obtain the most accurate and complete transformations.

SUMMARY

According to one embodiment of the present invention, application behavior is analyzed to determine relationships between data. Database objects accessed by an application are identified. Then, one or more relationships between the identified database objects are determined based on one or more from a group comprising statements of the application referring to the identified database objects and sets of the identified database objects accessed by different modules of the application.

BRIEF DESCRIPTION OF THE DRAWINGS

Generally, like reference numerals in the various figures are utilized to designate like components.

DETAILED DESCRIPTION

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Figure 1:
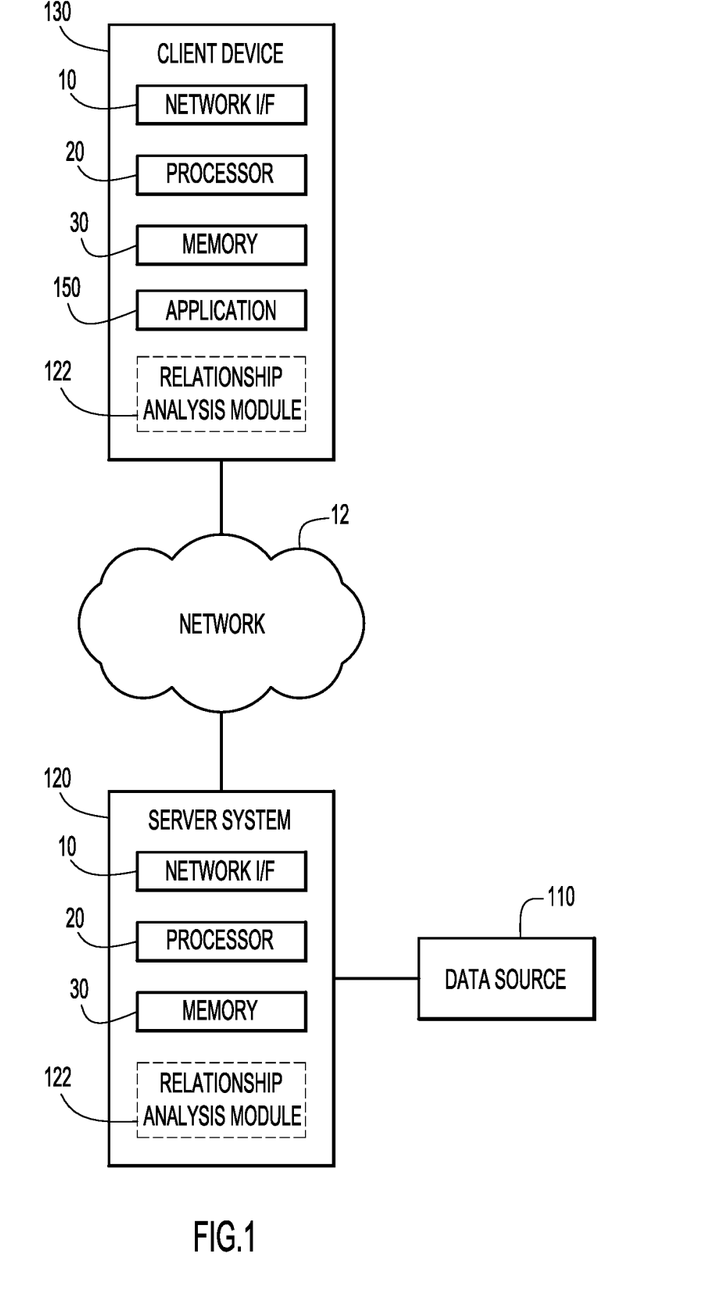
FIG. 1 illustrates an example environment in which the present general inventive concept can be embodied.
Figure 2:
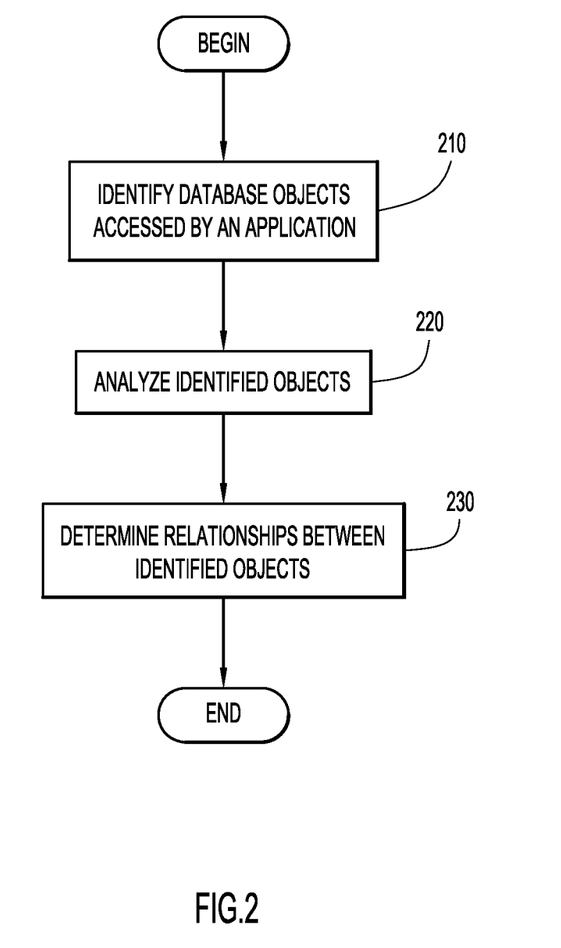
FIG. 2 is a procedural flow chart of an example method analyzing application behavior to determine relationships between data according to a present invention embodiment.
Figure 3:
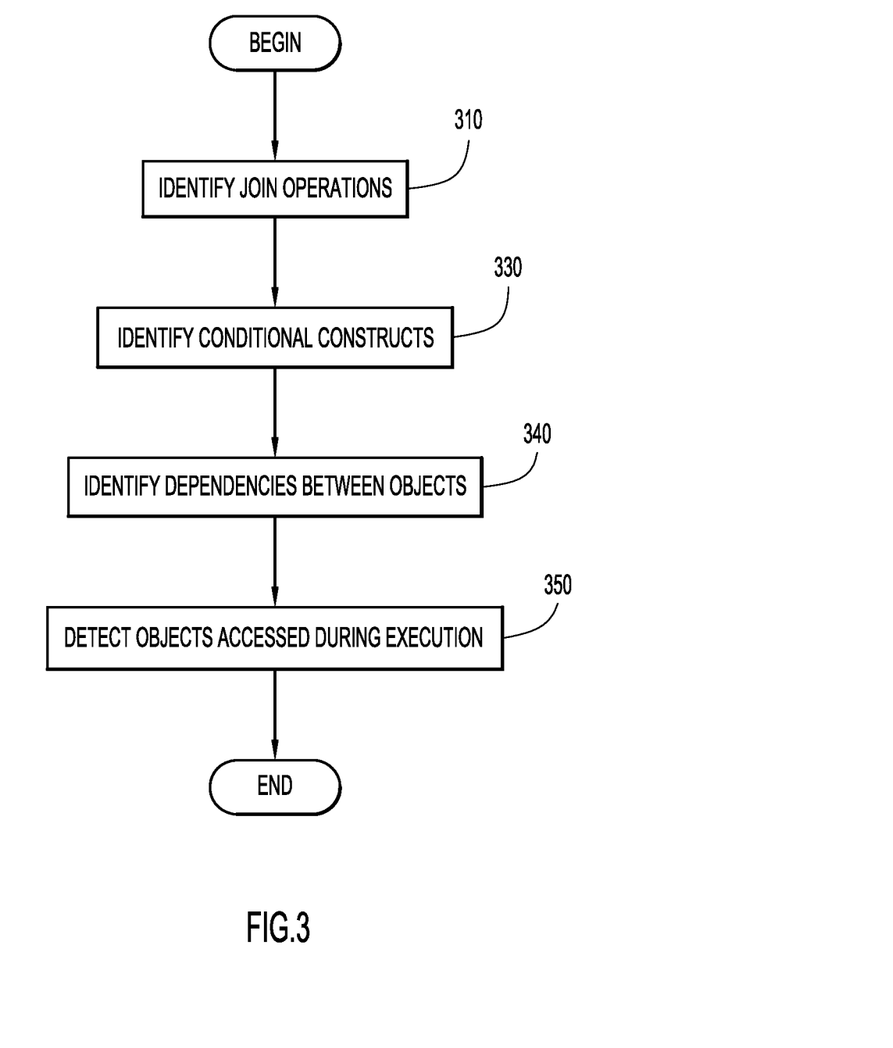
FIG. 3 is a procedural flow chart of an example method of analyzing identified database objects according to a present invention embodiment.

Generally referring to the FIGS. 1-3, present invention embodiments are configured to identify data relationships by analyzing application run time behavior. Analyzing application run time behavior can accurately and quickly provide deep insight into how various data objects (e.g., business entities, tables, data models, etc.) are related to each other based on their run time interactions. Application run time behavioral patterns reveal database relationships that might not be immediately apparent from table structures and, thus, identifying application level relationships may augment or replace current data analysis tools that initially provide a number of incorrect or false relationships during the analysis phase of the discovery process. To discover these patterns, applications can be analyzed statically (e.g., as an augmentation of the compiler) or dynamically upon execution. In the latter case, applications may be monitored over a period of time in order to derive the relationships between identified objects based on how at least one application associates or accesses different database objects, such as how an application joins various entities of underlying data models.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data sources 110, server systems 120, and/or client systems 130 may be local to each other, and communicate via any appropriate local communication medium (e.g., local area network (LAN), hardwire, wireless link, intranet, etc.). A data source 110 may be implemented by any conventional information storage system (e.g., database, file system server, etc.).

A server system 120 may include a relationship analysis module 122. The relationship analysis module 122 may be implemented across plural server systems. Alternatively, the relationship analysis module 122, or at least a portion thereof, may reside on a client system 130 for use with an interface of the client system 130. Client systems 130 enable users to communicate with the server system 120 (e.g., via network 12). The client systems may present any graphical user interface (e.g., GUI, etc.) or other interface (e.g., command line prompts, menu screens, etc.) to receive commands from users and interact with the relationship analysis module 122 and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software. The client systems 130 may also include any number of applications 150 installed or stored thereon.

The relationship analysis module 122 may include one or more modules or units to perform the various functions of present invention embodiments described below. The relationship analysis module 122 may be implemented by any combination of any quantity of software and/or hardware modules or units, and/or may reside within memory 30 of a server system and/or client systems for execution by processor 20. In preferred embodiments, the relationship analysis module 122 is configured to sit atop a data source 110 in order to read any requests sent to the data source 110.

A manner of analyzing application behavior to determine relationships between data (e.g. via relationship analysis module 122, server system 120 and/or client system 130) according to an embodiment of the present invention is illustrated in FIG. 2. Initially, at step 210, database objects accessed by an application are identified. Specifically, any database-access statements included in a target application may be isolated in order to determine which database objects are specified within and being accessed by the application access statements. In some embodiments, database access statements may include any desirable kind of SQL or process used to access a database, such as JSQL statements in JAVA, regular SQL statements, procedural language code such as procedures, functions, triggers, etc. or any other form of application that accesses any desirable database, including both relational and non relational databases.

Once accessed database objects are identified, the identified objects may be analyzed at step 220. As is discussed in detail below with regards to FIG. 3, the analysis performed at step 220 may reveal certain characteristics, behaviors, application actions, etc. that might identify how various database objects are or might be related to each other. Then, at step 230, the relationships between the identified objects may be determined based on the revealed or determined characteristics gleaned at step 220.

In FIG. 3, an example method for analyzing identified database objects is illustrated. However, the illustrated method is only one example embodiment and it is to be understood that, in other embodiments, a portion of these steps may be performed in order to analyze identified database objects. Alternatively, in some embodiments, additional analysis steps may be performed together with any number of the steps illustrated in FIG. 3 if desired. For example, in some embodiments, the analysis performed at step 220 may, in addition to the steps shown in FIG. 3, create temporary database objects to temporarily index temporary data files and further analyze run time relationships.

Moreover, generally referring to FIG. 3, any of the steps identified in FIG. 3, as well as any other analysis performed to identify relationships between database objects may be performed statically or dynamically, insofar as dynamically refers to analysis performed during execution of an application and statically refers to analysis performed without execution of an application. For example, in some embodiments, static analysis may be performed by analyzing statements or requests (e.g., SQL statements) included in an application, across applications, etc. in order to identify any join operations included therein. Moreover, statements generated over a period of time could be logged and uploaded for analysis, at which point, any desirable operations, statements, etc. could be analyzed in order to determine relationships that an application applies or infers within the database. Alternatively, at least because some queries are not embedded in application source code, analysis may be performed dynamically upon execution of an application to identify similar operations, statements, etc. generated and/or executed by the application that identify or indicate relationships in or between database objects. Consequently, relationships may be determined on a rolling basis as statements or requests come in over time.

In the example method shown in FIG. 3, any join operations performed by an application may be identified at step 310. Specifically, any join columns between one or more tables specified in a database program query may be identified. For example, if an application defines that department.deptno=employee.deptno, the join column between the two tables department and employee may be identified as deptno. and this relationship may be associated with the corresponding database. By comparison, when the relationships in or actions executed by an application are more complex, such as in authentic business transactions where SQL transactions can be extremely complex and include multi level joins and other complexities like self joins, nested queries, aggregate queries etc., the analysis may identify any of these actions as joins, as well any other type of SQL techniques used to extract join columns. For example, any cross joins, natural joins, inner joins, left (outer) joins, and right (outer joins) may be identified in order to detect one-to-one, one-to-many, many-to-one, many-to-many, and self referencing relationships, respectively, used or referenced by application statements that are accessing database objects included in a database.

At step 330, any conditional constructs may be identified in order to derive enforced relationships (e.g., statements which enforce application level referential integrity). For example, if an application provides instructions that require parent tables to be checked for the existence of a parent record if a record is to be inserted into a child table, this conditional construct may be identified. Identifying these constructs may directly reveal related data objects (e.g., parent/child, primary/foreign key, etc.). As another example, since a primary key in a database table is always unique and every child table necessarily needs to have a corresponding record in its parent table, if the parent record is deleted all the related child records either become orphan records or are automatically deleted. Thus, identifying a primary key may essentially map records included in one database table to records included in another database table. Thus, identifying a primary key provides one instance of identifying a conditional construct that provides an enforced relationship.

Similarly, foreign keys, composite keys, and cluster columns may be identified at step 330 in order to determine relationships between database objects. Generally, identified keys may indicate that records within a database table have a corresponding record in another database table. More specifically, a foreign key may indicate that every record has a corresponding record in a parent table. By comparison, a composite key may utilize multiple columns in a first table in order to determine the related column in a second table. Cluster columns may organize a table based upon information from a key, such as by organizing remaining data around a specific piece of data identified in the key, such that a single read operation may be used to obtain a number of pieces of data. Consequently, if cluster columns are identified, a number of different pieces of data may be determined to be related. Alternatively, if a read operation returns a number of pieces of data, a cluster column may be detected and, thus, the returned data may be determined to be related.

At step 340, any dependencies between groups of database objects are identified. For example, any tables which are accessed by different modules within an application may be identified and the different modules that are accessing the database objects may be determined to be related. Similarly, if multiple applications access a specific database object, these applications may be determined to be related to the database object and each other, at least via the accessed database object.

Since, as mentioned, static analysis may not detect all relationships between database objects, a dynamic approach can be used in addition to, or in conjunctions with, static analysis. As an example, at step 350, objects accessed during execution of an application may be detected. Specifically, at run time, database-access statements may be generated and detected and the objects accessed by those statements may be identified by a middleware component. Thus, any tables, data models, or other such data objects accessed during execution of an application may be detected and associated with a certain task or group of tasks performed at or around the same time. Moreover, if different database objects are accessed together, used together, or otherwise associated, these execution-based relationships may be considered in order to validate or detect a relationship. Conversely, a relationship between database objects that is allegedly discovered prior to execution of the application may be determined to be a false relationship based on how the database objects are accessed during execution of an application.

In operation, the aforementioned module 122 may allow various transactions to be quickly performed while utilizing minimal time and processing resources. For example, if a corporate system needs to be accessed to retrieve data for an employee belonging to a specific department, this query might need data from at least employee and department tables to determine relationships needed for the query. If, in analyzing these table objects, it is determined that the tables having an index or a constraint like a primary key or foreign key, the data can be quickly retrieved. However, in many situations, the columns which are joined together may not have any database level relations or even other supporting artifacts like an index or a constraint. In this case, module 122 may identify the application level relationships to determine the relationships between the various corporate tables so that the query can quickly return the appropriate information. When this is extrapolated to specific exercises like data mining or a business object archive, this relationship determination may save an immense amount of time and resources.

It will be appreciated that the embodiments described above and illustrated in the drawings represent only a few of the many ways of implementing embodiments of analyzing application behavior to determine relationships between data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., identities of database objects). The database system may be implemented by any number of any conventional or other databases, data stores or storage structures (e.g., files, databases, data structures, data or other repositories, etc.) to store information (e.g., identities of database objects). The database system may be included within or coupled to the server and/or client systems. The database systems and/or storage structures may be remote from or local to the computer or other processing systems, and may store any desired data (e.g., identities of database objects).

The present invention embodiments may employ any number of any type of user interface (e.g., Graphical User Interface (GUI), command-line, prompt, etc.) for obtaining or providing information (e.g., progress of the database object analysis), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of analyzing application behavior to determine relationships between data comprising:
   identifying database objects accessed by an application, wherein the database objects include database tables;
   determining a plurality of first relationships between columns of the identified database objects based on an analysis of database access statements of the application, wherein the analysis of the database access statements is performed without execution of the application and at least one first relationship is determined between the columns of the identified database objects based on a first plurality of columns of different identified database objects appearing in a same database access statement, and wherein at least one other first relationship is determined between the columns of the identified database objects based on a key linking a second plurality of columns of different identified database objects;

executing the application and monitoring access of different database objects during execution of the application;

determining one or more second relationships between the columns of the identified database objects based on an analysis of the monitored access, wherein at least one second relationship is determined between the columns of the identified database objects based on a third plurality of columns of the identified database objects being accessed together;

validating the plurality of first relationships based on the one or more second relationships, wherein the validating includes determining that at least one first relationship between corresponding columns of the identified database objects is false based on a manner in which the corresponding columns of the identified database objects are accessed during execution of the application; and processing a query, involving two or more columns of the identified database objects, to retrieve information based on the validated first relationships and the one or more second relationships for the two or more columns of the query.

2. The method of claim 1, wherein the determining the plurality of first relationships includes:

determining a first relationship between the identified database objects based on database object elements within the database access statements of the application specifying a join operation.

3. The method of claim 1, wherein the determining the plurality of first relationships includes:

determining a first relationship between the identified database objects based on conditional constructs within the database access statements of the application enforcing relationships between the identified database objects.

4. The method of claim 3, wherein the conditional constructs employ a key and the first relationship is determined based on mappings included in the key.

5. The method of claim 1, wherein the determining the plurality of first relationships includes:

determining a first relationship between the identified database objects by identifying dependencies between sets of the identified database objects accessed by different modules of the application.

6. The method of claim 1, wherein the query includes a join of the two or more columns of the identified database objects which are viewed as unrelated by a database, and processing the query includes:

utilizing the validated first relationships and the one or more second relationships to determine relationships between the identified database objects of the query; and performing the join of the two or more columns of the identified database objects based on the determined relationships between the identified database objects of the query.

7. A system for analyzing application behavior to determine relationships between data comprising:

a processor configured to:

identify database objects accessed by an application, wherein the database objects include database tables;

determine a plurality of first relationships between columns of the identified database objects based on an analysis of database access statements of the application, wherein the analysis of the database access statements is performed without execution of the application and at least one first relationship is determined between the columns of the identified database objects based on a first plurality of columns of different identified database objects appearing in a same database access statement, and wherein at least one other first relationship is determined between the columns of the identified database objects based on a key linking a second plurality of columns of different identified database objects;

execute the application and monitor access of different database objects during execution of the application;

determine one or more second relationships between the columns of the identified database objects based on an analysis of the monitored access, wherein at least one second relationship is determined between the columns of the identified database objects based on a third plurality of columns of the identified database objects being accessed together;

validate the plurality of first relationships based on the one or more second relationships, wherein the validating includes determining that at least one first relationship between corresponding columns of the identified database objects is false based on a manner in which the corresponding columns of the identified database objects are accessed during execution of the application; and process a query, involving two or more columns of the identified database objects, to retrieve information based on the validated first relationships and the one or more second relationships for the two or more columns of the query.

8. The system of claim 7, wherein the processor, in determining the plurality of first relationships, is further configured to:

determine a first relationship between the identified database objects based on database object elements within the database access statements of the application specifying a join operation.

9. The system of claim 7, wherein the processor, in determining the plurality of first relationships, is further configured to:

determine a first relationship between the identified database objects based on conditional constructs within the database access statements of the application enforcing relationships between the identified database objects.

10. The system of claim 9, wherein the conditional constructs employ a key and the first relationship is determined based on mappings included in the key.

11. The system of claim 7, wherein the processor, in determining the plurality of first relationships, is further configured to:

determine a first relationship between the identified database objects by identifying dependencies between sets of the identified database objects accessed by different modules of the application.

12. The system of claim 7, wherein the query includes a join of the two or more columns of the identified database objects which are viewed as unrelated by a database, and processing the query includes:

utilizing the validated first relationships and the one or more second relationships to determine relationships between the identified database objects of the query; and performing the join of the two or more columns of the identified database objects based on the determined relationships between the identified database objects of the query.

13. A computer program product for analyzing application behavior to determine relationships between data, comprising one or more non-transitory computer-readable storage media collectively having computer-readable program code embodied thereon, the computer-readable program code, when executed by a processor, causes the processor to:
- identify database objects accessed by an application, wherein the database objects include database tables;
- determine a plurality of first relationships between columns of the identified database objects based on an analysis of database access statements of the application, wherein the analysis of the database access statements is performed without execution of the application and at least one first relationship is determined between the columns of the identified database objects based on a first plurality of columns of different identified database objects appearing in a same database access statement, and wherein at least one other first relationship is determined between the columns of the identified database objects based on a key linking a second plurality of columns of different identified database objects;
- execute the application and monitor access of different database objects during execution of the application;
- determine one or more second relationships between the columns of the identified database objects based on an analysis of the monitored access, wherein at least one second relationship is determined between the columns of the identified database objects based on a third plurality of columns of the identified database objects being accessed together;
- validate the plurality of first relationships based on the one or more second relationships, wherein the validating includes determining that at least one first relationship between corresponding columns of the identified database objects is false based on a manner in which the corresponding columns of the identified database objects are accessed during execution of the application; and
- process a query, involving two or more columns of the identified database objects, to retrieve information based on the validated first relationships and the one or more second relationships for the two or more columns of the query.

14. The computer program product of claim 13, wherein the computer-readable program code that causes the processor to determine the plurality of first relationships is further configured to cause the processor to:
- determine a first relationship between the identified database objects based on database object elements within the database access statements of the application specifying a join operation.

15. The computer program product of claim 13, wherein the computer-readable program code that causes the processor to determine the plurality of first relationships is further configured to cause the processor to:
- determine a first relationship between the identified database objects based on conditional constructs within the database access statements of the application enforcing relationships between the identified database objects.

16. The computer program product of claim 13, wherein the computer-readable program code that causes the processor to determine the plurality of first relationships is further configured to cause the processor to:
- determine a first relationship between the identified database objects by identifying dependencies between sets of the identified database objects accessed by different modules of the application.

17. The computer program product of claim 13, wherein the query includes a join of the two or more columns of the identified database objects which are viewed as unrelated by a database, and processing the query includes:
- utilizing the validated first relationships and the one or more second relationships to determine relationships between the identified database objects of the query; and
- performing the join of the two or more columns of the identified database objects based on the determined relationships between the identified database objects of the query.

* * * * *